United States Patent
Niewiadomski et al.

(10) Patent No.: US 10,960,721 B2
(45) Date of Patent: Mar. 30, 2021

(54) SYSTEM FOR DETECTION AND RESPONSE TO RETREATING TRAILER

(71) Applicant: Ford Global Technologies, LLC, Dearborn, MI (US)

(72) Inventors: Luke Niewiadomski, Hamtramck, MI (US); Chen Zhang, San Jose, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 267 days.

(21) Appl. No.: 16/018,920

(22) Filed: Jun. 26, 2018

(65) Prior Publication Data

US 2019/0389260 A1    Dec. 26, 2019

(51) Int. Cl.
| | |
|---|---|
| *B60D 1/36* | (2006.01) |
| *B60R 1/00* | (2006.01) |
| *B60R 11/04* | (2006.01) |
| *B62D 15/02* | (2006.01) |
| *B62D 5/04* | (2006.01) |
| *B60D 1/06* | (2006.01) |

(52) U.S. Cl.
CPC ............... *B60D 1/36* (2013.01); *B60R 1/003* (2013.01); *B60R 11/04* (2013.01); *B62D 15/025* (2013.01); *B60D 1/06* (2013.01); *B60R 2300/808* (2013.01); *B62D 5/0463* (2013.01)

(58) Field of Classification Search
CPC .......... B60D 1/36; B60D 1/06; B62D 15/025; B62D 5/0463; B62D 15/0285; B60R 11/05; B60R 1/003; B60R 2300/808; B60R 1/00; B60R 2300/406
See application file for complete search history.

(56) References Cited

U.S. PATENT DOCUMENTS

| | | | |
|---|---|---|---|
| 9,102,271 B2 | 8/2015 | Trombley et al. | |
| 9,102,971 B2* | 8/2015 | Kurokawa | ............... C12P 21/02 |
| 9,434,381 B2 | 9/2016 | Windeler | |
| 9,499,018 B2 | 11/2016 | Gehrke et al. | |
| 9,550,399 B2 | 1/2017 | Jones et al. | |
| 2004/0226768 A1 | 11/2004 | DeLuca et al. | |
| 2005/0246081 A1 | 11/2005 | Bonnet et al. | |
| 2006/0293800 A1 | 12/2006 | Bauer et al. | |
| 2012/0283909 A1 | 11/2012 | Dix | |
| 2013/0226390 A1* | 8/2013 | Luo | ........................... B60D 1/36 701/25 |
| 2014/0183841 A1 | 7/2014 | Jones | |
| 2016/0185169 A1 | 6/2016 | Strand | |
| 2016/0272024 A1 | 9/2016 | Bochenek et al. | |
| 2016/0378118 A1* | 12/2016 | Zeng | ........................ B60D 1/62 701/28 |
| 2017/0050567 A1* | 2/2017 | Bochenek | ........... G06F 3/04842 |
| 2017/0158007 A1* | 6/2017 | Lavoie | .................. B60W 10/30 |

(Continued)

FOREIGN PATENT DOCUMENTS

EP    2682329 A1    1/2014

*Primary Examiner* — Marthe Y Marc-Coleman
(74) *Attorney, Agent, or Firm* — Raymond Coppiellie; Price Heneveld LLP (57) ABSTRACT

A vehicle system comprises a hitch ball mounted on a vehicle and a controller. The controller is configured to identify a coupler position of a trailer and control movement of the vehicle aligning the hitch ball with the coupler position. The controller is further configured to identify a change in the coupler position and stop the motion of the vehicle in response to the change in position of the trailer.

20 Claims, 7 Drawing Sheets

(56) References Cited

U.S. PATENT DOCUMENTS

| | | | |
|---|---|---|---|
| 2018/0081370 A1* | 3/2018 | Miller | B60D 1/36 |
| 2018/0272941 A1* | 9/2018 | Bliss | B60D 1/62 |
| 2018/0284781 A1* | 10/2018 | Cohen | G05D 1/028 |
| 2018/0312022 A1* | 11/2018 | Mattern | G05D 1/0225 |
| 2019/0086927 A1* | 3/2019 | Skvarce | G05D 1/0212 |
| 2019/0340787 A1* | 11/2019 | Ramirez Llanos | G05D 1/0251 |
| 2019/0346856 A1* | 11/2019 | Berkemeier | G05D 1/0278 |

* cited by examiner

SYSTEM FOR DETECTION AND RESPONSE TO RETREATING TRAILER

FIELD OF THE DISCLOSURE

The present disclosure generally relates to a system for assisting in a vehicle-trailer hitching operation. In particular, the present disclosure relates to a system for detecting movement of a trailer while assisting in a vehicle-trailer hitching operation.

BACKGROUND OF THE DISCLOSURE

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. Further, through a significant portion of the driving needed for appropriate hitch ball alignment, the trailer hitch cannot be seen, and the hitch ball can, under ordinary circumstances, never actually be seen by the driver. This lack of sight lines requires an inference of the positioning of the hitch ball and hitch based on experience with a particular vehicle and trailer, and can still require multiple instances of stopping and stepping out of the vehicle to confirm alignment or to note an appropriate correction for a subsequent set of maneuvers. Even further, the closeness of the hitch ball to the rear bumper of the vehicle means that any overshoot can cause a collision of the vehicle with the trailer. Accordingly, further advancements may be desired.

SUMMARY OF THE DISCLOSURE

According to one aspect of the present disclosure, a vehicle system is disclosed. The system comprises a hitch ball mounted on a vehicle and a controller. The controller is configured to identify a coupler position of a trailer and control movement of the vehicle aligning the hitch ball with the coupler position. The controller is further configured to identify a change in the coupler position and stop the motion of the vehicle in response to the change in position of the trailer.

Embodiments of the first aspect of the invention can include any one or a combination of the following features:
- a stopping distance is adjusted based on a proximity of the vehicle to the coupler position;
- a sensor apparatus in communication with the controller, wherein the sensor apparatus is configured to scan a region proximate to the vehicle and detect the coupler position of a coupler of the trailer;
- the sensor apparatus comprises an imaging system including one or more cameras mounted on the vehicle; wherein the controller identifies the coupler position based on image data received from the imaging system comprising position data of the coupler;
- the change in the coupler position is identified in response to a change in the coupler position exceeding a predetermined change threshold;
- the predetermined change threshold comprises a distance threshold identified over a predetermined time;
- the coupler position is a location of a coupler of the trailer, wherein the coupler is configured to mate to the hitch in a towing configuration;
- the controller is further configured to apply a first motion control to the movement of the vehicle in response to identifying the change in the coupler position when the vehicle is beyond a predetermined distance of the trailer;
- the controller is further configured to apply a second motion control to the movement of the vehicle in response to identifying the change in the coupler position when the vehicle is within the predetermined distance;
- the first motion control stops the vehicle over a greater distance than the second motion control;
- the first motion control comprises gradually applying service brakes of the vehicle and the second motion control comprises rapidly applying the service brakes of the vehicle;
and
- the predetermined distance identifies that the hitch is within a collision proximity relative to the coupler.

According to another aspect of the present disclosure, a method for controlling a vehicle is disclosed. The method comprises identifying a coupler position of a trailer in sensor data and controlling motion of the vehicle aligning the hitch ball with the coupler position. The method further comprises identifying a change in the coupler position in response to the coupler position exceeding a position change threshold and stopping the motion of the vehicle in response to the change in position of the trailer.

According to another aspect of the present disclosure, a vehicle system is disclosed. The system comprises a hitch ball mounted on a vehicle, a sensor system configured to detect a coupler position of a trailer and a controller. The controller is configured to control motion of the vehicle aligning the hitch ball with the coupler position and monitor a coupler distance of the coupler position relative to the vehicle. The controller is further configured to identify a change in the coupler position and stop the motion of the vehicle in response to the change in position of the trailer. The stopping of the motion of the vehicle is completed over a greater travel distance of the vehicle in response to the coupler distance being greater than a collision proximity between the vehicle and the trailer.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
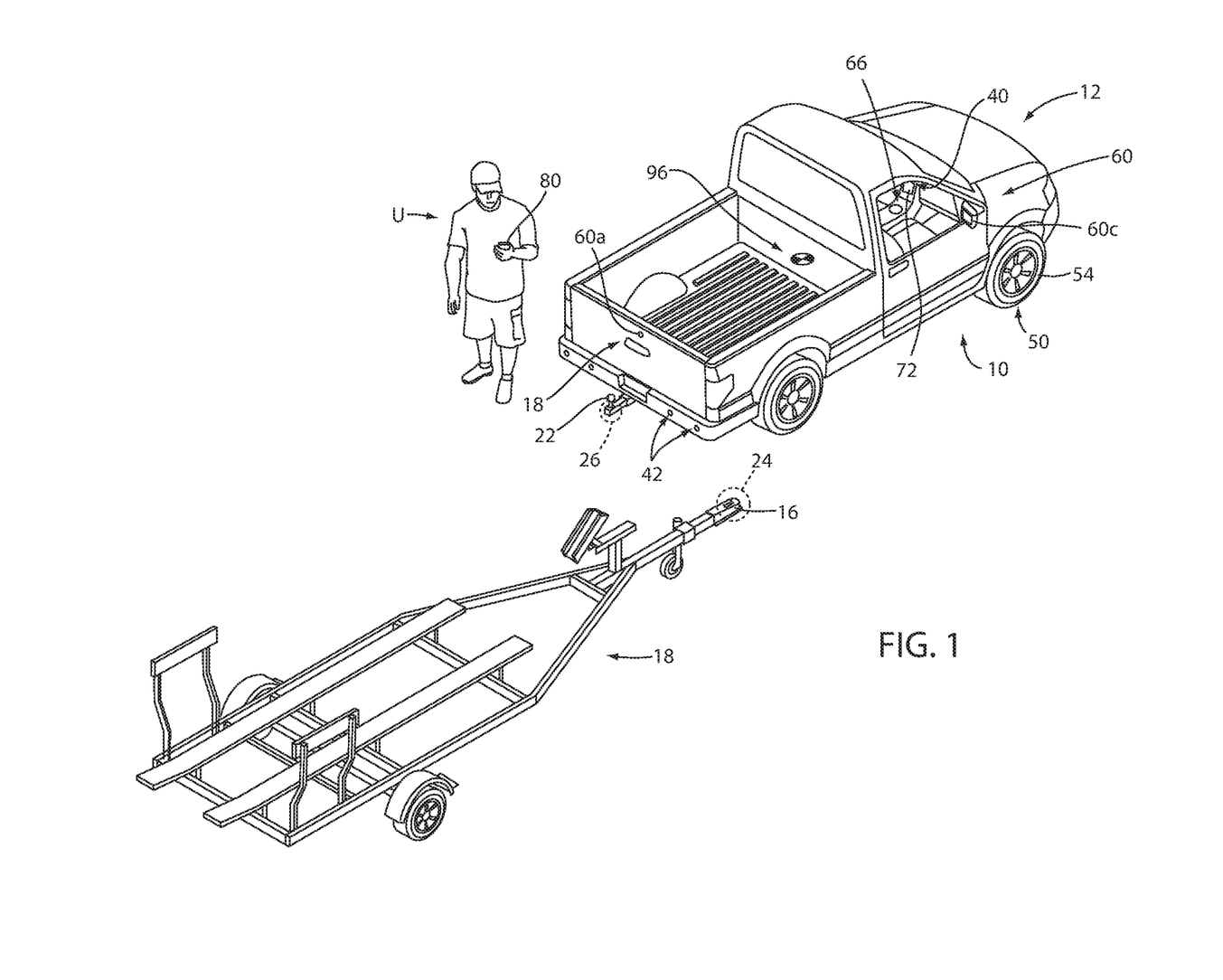
FIG. 1 is a perspective view of a vehicle in an unhitched position relative to a trailer.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction or the like does not mean that the feature or component follows a straight line or axis in such a direction or that it only extends in such direction or on such a plane without other directional components or deviations, unless otherwise specified.

Referring generally to FIGS. 1-5, reference numeral 10 designates a hitch assistance system (also referred to as a "hitch assist" system) for a vehicle 12. In various embodiments, the hitch assist system 10 includes a controller 14 configured to acquire position data of a coupler 16 of a trailer 18. The controller 14 may be configured to derive a vehicle path 20 to align a hitch ball 22 of the vehicle 12 with the coupler 16. Deriving the vehicle path 20 may include a variety of steps including detecting and compensating for a change in a coupler position 24 in order to control the vehicle 12 to locate a hitch position 26 aligned with the coupler 16. The vehicle path 20 may comprise a plurality of segments 28, which may correspond to changes in the operating direction or steering direction of the vehicle 12. In various embodiments, deriving the vehicle path 20 may include navigating around intervening objects or structures, operating over uneven terrain, following a desired path indicated by an operator or user U, etc. Accordingly, the disclosure may provide for the hitch assist system 10 to provide for improved navigation of the vehicle 12 and/or interaction with the coupler 16 such that trailer 18 may be effectively connected to the vehicle 12 without complication.

In some embodiments, the system 10 may be configured to detect a change in the coupler position 24. Such a change corresponds to a movement of the trailer 18. The movement of the trailer 18 may result due to an instability of the trailer related to an inclined surface or an external force applied to the trailer 18. Additionally, an apparent movement of the coupler position 24 may result from a false identification of the coupler 16 or an intentionally misleading imitation of the coupler 16 that changes position over time. In any of these situations, the system 10 may detect a change in the coupler position 24, which may serve to prevent runaway operation of the hitch assist system 10. For example, in response to identifying a change in the coupler position 24, the system 10 may halt an assisted or automated motion of the vehicle 12 such that the vehicle 12 does not follow a moving coupler or misidentified object.

Figure 2:
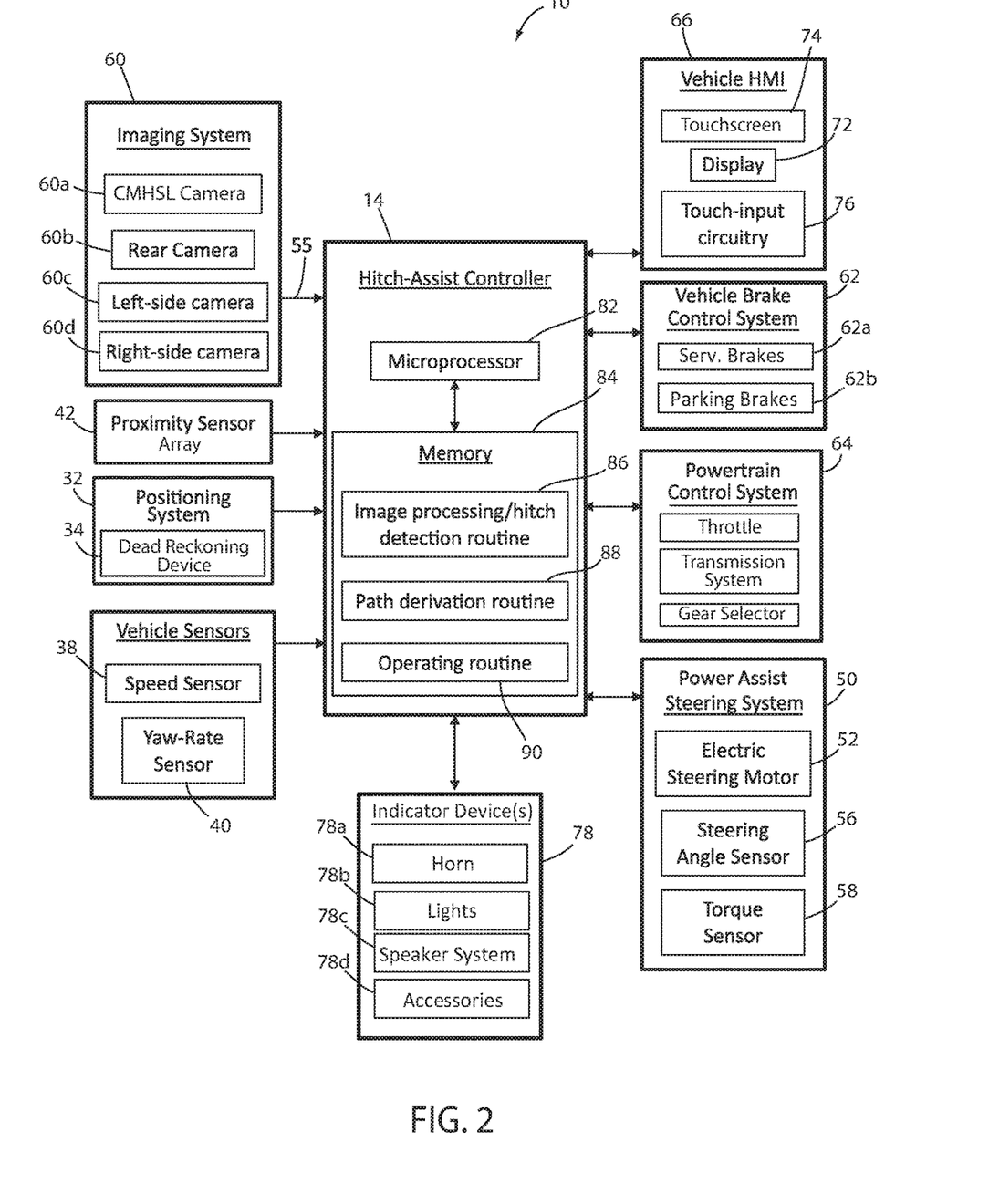
FIG. 2 is a diagram of a system according to an aspect of the disclosure for assisting in aligning the vehicle with a trailer in a position for hitching the trailer to the vehicle.
Figure 3:
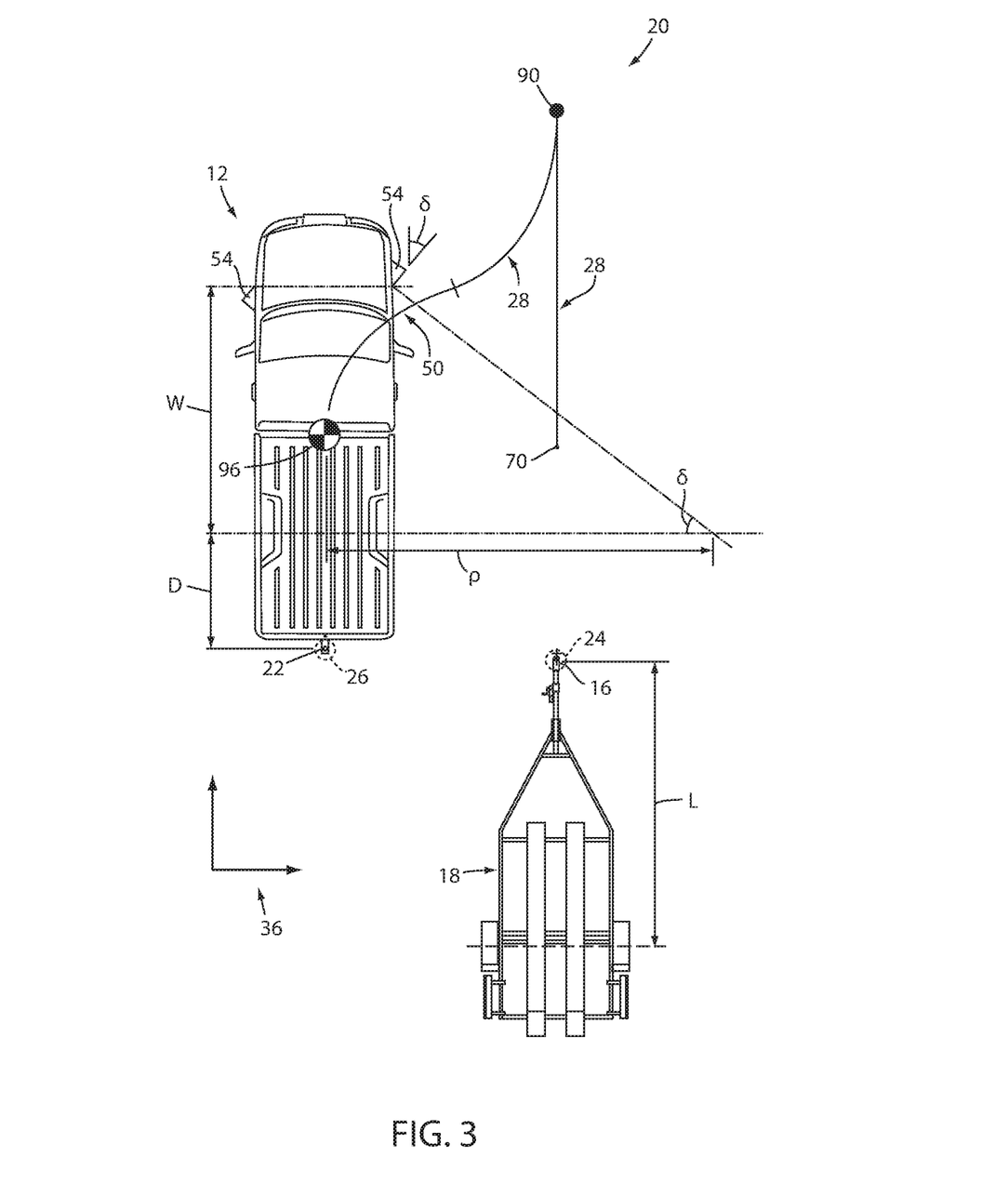
FIG. 3 is an overhead schematic view of a vehicle during a step of the alignment sequence with the trailer.
Figure 4:
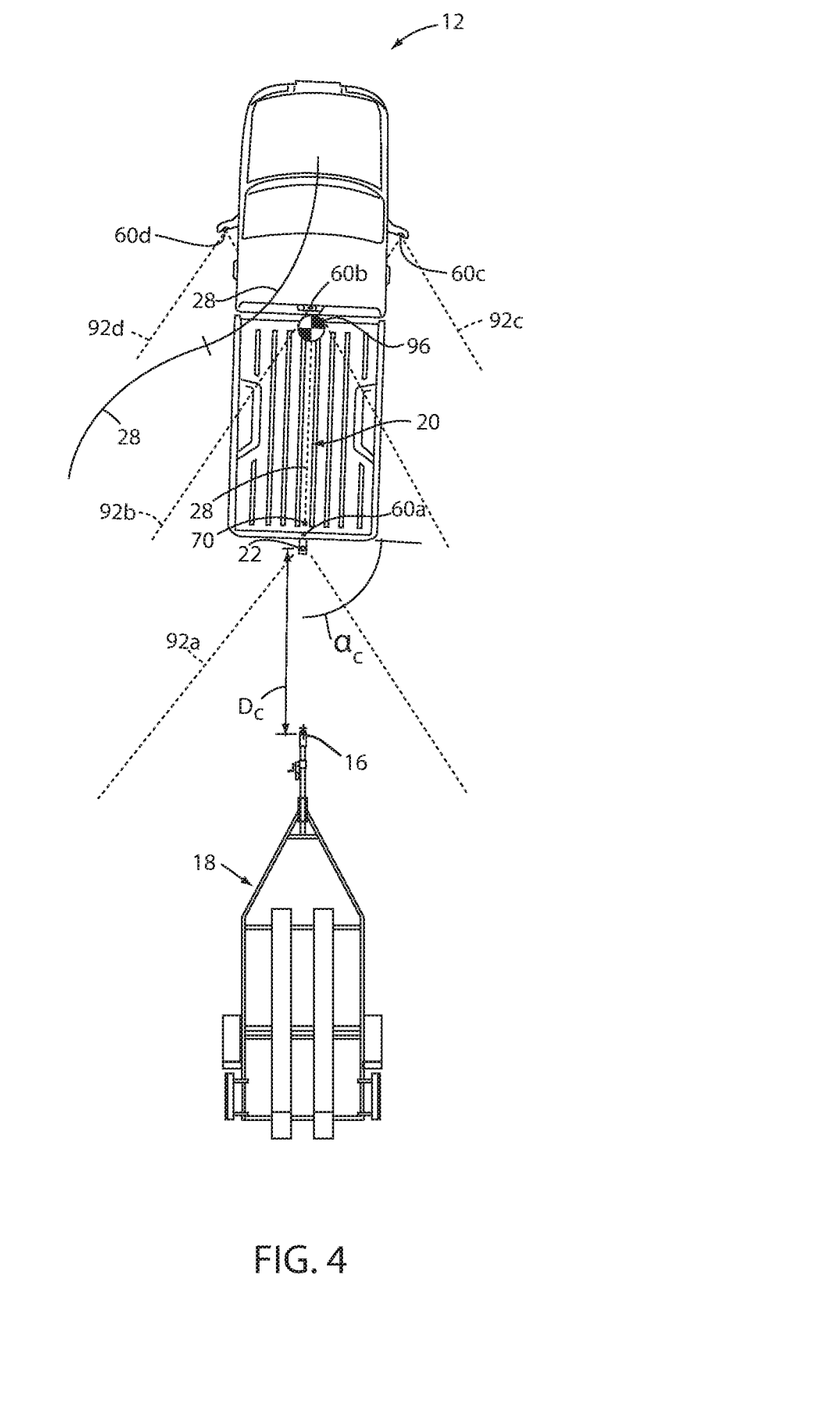
FIG. 4 is a is an overhead schematic view of a vehicle during a step of the alignment sequence with the trailer.

With respect to the general operation of the hitch assist system 10, as illustrated in the system diagram of FIGS. 2-4, the system 10 includes various sensors and devices that obtain or otherwise provide vehicle status-related information. This information includes positioning information from a positioning system 32, which may include a dead reckoning device 34 or, in addition or as an alternative, a global positioning system (GPS), to determine a coordinate location of the vehicle 12 based on the one or more locations of the devices within the positioning system 32. In particular, the dead reckoning device 34 can establish and track the coordinate location of the vehicle 12 within a localized coordinate system 36 based at least on vehicle speed and steering angle δ as shown in FIG. 3. Other vehicle information received by hitch assist system 10 may include a speed of the vehicle 12 from a speed sensor 38 and a yaw rate of the vehicle 12 from a yaw rate sensor 40. It is contemplated that in additional embodiments, a proximity sensor 42 or an array thereof, and other vehicle sensors and devices may provide sensor signals or other information, such as sequential images of the trailer 18, including the detected coupler 16, that the controller 14 of the hitch assist system 10 may process with various routines to determine the height $H_c$ and coupler position 24 (e.g., based on the distance $D_c$ and angle $α_c$) of coupler 16.

As further shown in FIG. 2, one embodiment of the hitch assist system 10 is in communication with the steering system 50 of vehicle 12. The steering system 50 may be a power assist steering system 50 including a steering motor 52 to operate the steered wheels 54 (FIG. 1) of the vehicle 12 for moving the vehicle 12 in such a manner that the vehicle yaw changes with the vehicle velocity and the steering angle δ. In the illustrated embodiment, the power assist steering system 50 is an electric power-assisted steering ("EPAS") system including electric steering motor 52 for turning the steered wheels 54 to a steering angle δ based on a steering command, whereby the steering angle δ may be sensed by a steering angle sensor 56 of the power assist steering system 50. The steering command may be provided by the hitch assist system 10 for autonomously steering during a trailer hitch alignment maneuver and may alternatively be provided manually via a rotational position (e.g., steering wheel angle) of a steering wheel of vehicle 12.

In the illustrated embodiment, the steering wheel of the vehicle 12 is mechanically coupled with the steered wheels 54 of the vehicle 12, such that the steering wheel moves in concert with steered wheels 54, preventing manual intervention with the steering wheel during autonomous steering. More specifically, a torque sensor 58 is provided on the power assist steering system 50 that senses torque on the steering wheel that is not expected from autonomous control of the steering wheel and therefore indicative of manual intervention. In this configuration, the hitch assist system 10 may alert the driver to discontinue manual intervention with the steering wheel and/or discontinue autonomous steering. In alternative embodiments, some vehicles have a power assist steering system 50 that allows a steering wheel to be partially decoupled from movement of the steered wheels 54 of such a vehicle.

With continued reference to FIG. 2, the power assist steering system 50 provides the controller 14 of the hitch assist system 10 with information relating to a rotational position of steered wheels 54 of the vehicle 12, including a steering angle δ. The controller 14 in the illustrated embodiment processes the current steering angle, in addition to other vehicle 12 conditions to guide the vehicle 12 along the desired path 20 (FIG. 3). It is conceivable that the hitch assist system 10, in additional embodiments, may be an integrated component of the power assist steering system 50. For example, the power assist steering system 50 may include a hitch assist algorithm for generating vehicle steering information and commands as a function of all or a portion of information received from an imaging system 60, the power assist steering system 50, a vehicle brake control system 62, a powertrain control system 64, and other vehicle sensors and devices, as well as a human-machine interface ("HMI") 66, as discussed further below.

As also illustrated in FIG. 2, the vehicle brake control system 62 may also communicate with the controller 14 to provide the hitch assist system 10 with braking information, such as vehicle wheel speed, and to receive braking commands from the controller 14. The brake control system 62 may be configured to control service brakes 62a and a parking brake 62b. The parking brake 62b may correspond to an electronic parking brake system that may be in communication with the controller 14. Accordingly in operation, the controller 14 may be configured to control the brakes 62a and 62b as well as detect vehicle speed information, which may be determined from individual wheel speed sensors monitored by the brake control system 62. Vehicle speed may also be determined from the powertrain control system 64, the speed sensor 38, and/or the positioning system 32, among other conceivable means. In some embodiments, individual wheel speeds can also be used to determine a vehicle yaw rate, which can be provided to the hitch assist system 10 in the alternative or in addition to the vehicle yaw rate sensor 40.

The hitch assist system 10 can further provide vehicle braking information to the brake control system 62 for allowing the hitch assist system 10 to control braking of the vehicle 12 during backing of the trailer 18. For example, the hitch assist system 10, in some embodiments, may regulate speed of the vehicle 12 during alignment of the vehicle 12 with the coupler 16 of trailer 18, which can reduce the potential for a collision with trailer 18, and can bring vehicle 12 to a complete stop at a determined endpoint 70 of the path 20. It is disclosed herein that the hitch assist system 10 can additionally or alternatively issue an alert signal corresponding to a notification of an actual, impending, and/or anticipated collision with a portion of trailer 18. As mentioned above, regulation of the speed of the vehicle 12 may be advantageous to prevent collision with trailer 18.

In some embodiments, the powertrain control system 64, as shown in the embodiment illustrated in FIG. 2, may also interact with the hitch assist system 10 for regulating speed and acceleration of the vehicle 12 during partial or autonomous alignment with trailer 18. During autonomous operation, the powertrain control system 64 may further be utilized and configured to control a throttle as well as a drive gear selection of a transmission of the vehicle 12. Accordingly, in some embodiments, the controller 14 may be configured to control a gear of the transmission system and/or prompt the user U to shift to a desired gear to complete semi-automated operations of the vehicle 12.

As previously discussed, the hitch assist system 10 may communicate with human-machine interface ("HMI") 66 of the vehicle 12. The HMI 66 may include a vehicle display 72, such as a center-stack mounted navigation or entertainment display (FIG. 1). HMI 66 further includes an input device, which can be implemented by configuring display 72 as a portion of a touchscreen 74 with circuitry 76 to receive an input corresponding with a location over display 72. Other forms of input, including one or more joysticks, digital input pads, or the like can be used in place or in addition to touchscreen 74. Further, the hitch assist system 10 may communicate via wireless communication with another embodiment of the HMI 66, such as with one or more handheld or portable devices 80 (FIG. 1), including one or more smartphones. The portable device 80 may also include the display 72 for displaying one or more images and other information to a user U. For instance, the portable device 80 may display one or more images of the trailer 18 on the display 72 and may be further configured to receive remote user inputs via touchscreen circuitry 76. In addition, the portable device 80 may provide feedback information, such as visual, audible, and tactile alerts.

In some embodiments, the hitch assist system 10 may further be in communication with one or more indicator devices 78. The indicator devices 78 may correspond to conventional vehicle indicators, such as a vehicle horn 78a, lights 78b, a speaker system 78c, vehicle accessories 78d, etc. In some embodiments, the indicator devices 78 may further include one or more accessories 78d, which may correspond to communication devices, remote controls, and a variety of devices that may provide for status and operational feedback between the user U and the vehicle 12. For example, in some embodiments, the HMI 66, the display 72, and the touchscreen 74 may be controlled by the controller 14 to provide status updates identifying the operation or receiving instructions or feedback to control the hitch assist system 10. Additionally, in some embodiments, the portable device 80 may be in communication with the controller 14 and configured to display or otherwise indicate one or more alerts or messages related to the operation of the hitch assist system 10.

Still referring to the embodiment shown in FIG. 2, the controller 14 is configured with a microprocessor 82 to process logic and routines stored in memory 84 that receive information from the above-described sensors and vehicle systems, including the imaging system 60, the power assist steering system 50, the vehicle brake control system 62, the powertrain control system 64, and other vehicle sensors and devices. The controller 14 may generate vehicle steering information and commands as a function of all or a portion of the information received. Thereafter, the vehicle steering information and commands may be provided to the power assist steering system 50 for affecting steering of the vehicle 12 to achieve a commanded path 20 (FIG. 3) of travel for alignment with the coupler 16 of trailer 18. The controller 14 may include the microprocessor 82 and/or other analog and/or digital circuitry for processing one or more routines. Also, the controller 14 may include the memory 84 for storing one or more routines, including an image processing routine 86 and/or hitch detection routine, a path derivation routine 88, and an operating routine 90.

It should be appreciated that the controller 14 may be a stand-alone dedicated controller or may be a shared controller integrated with other control functions, such as integrated with a vehicle sensor system, the power assist steering system 50, and other conceivable onboard or off-board vehicle control systems. It should further be appreciated that the image processing routine 86 may be carried out by a dedicated processor, for example, within a stand-alone imaging system for vehicle 12 that can output the results of its image processing to other components and systems of vehicle 12, including microprocessor 82. Further, any system, computer, processor, or the like, that completes image processing functionality, such as that described herein, may be referred to herein as an "image processor" regardless of other functionality it may also implement (including simultaneously with executing image processing routine 86).

System 10 may also incorporate the imaging system 60 that includes one or more exterior cameras 60a, 60b, 60c, 60d. Examples of exterior cameras are illustrated in FIG. 4 and include rear camera 60a, center high-mount stop light (CHMSL) camera 60b, and side-view cameras 60c and 60d, although other arrangements including additional or alternative cameras are possible. In one example, imaging system 60 can include rear camera 60a alone or can be configured such that system 10 utilizes only rear camera 60a in a vehicle with multiple exterior cameras 60. In another example, the various cameras 60a-60d included in imaging system 60 can be positioned to generally overlap in their respective fields of view, which in the depicted arrangement include fields of view 92a, 92b, 92c, and 92d to correspond with rear camera 60a, center high-mount stop light (CHMSL) camera 60b, and side-view cameras 60c and 60d, respectively. In this manner, image data from two or more of the cameras 60 can be combined in image processing routine 86, or in another dedicated image processor within imaging system 60, into a single image.

As an example of combining image data from multiple cameras, the image data can be used to derive stereoscopic image data that can be used to reconstruct a three-dimensional scene of the area or areas within overlapped areas of the various fields of view 92a, 92b, 92c, and 92d, including any objects (obstacles or coupler 16, for example) therein. In an embodiment, the use of two images including the same object can be used to determine a location of the object relative to the two image sources, given a known spatial relationship between the image sources. In this respect, the image processing routine 86 can use known programming and/or functionality to identify an object within image data from the various cameras 60a, 60b, 60c, and 60d within imaging system 60. In either example, the image processing routine 86 can include information related to the positioning of any cameras 60a, 60b, 60c, and 60d present on vehicle 12 or utilized by system 10, including relative to a center 96 (FIG. 1) of vehicle 12, for example, such that the positions of cameras 60a, 60b, 60c, and 60d relative to center 96 and/or to each other can be used for object positioning calculations and to result in object position data relative to the center 96 of vehicle 12, for example, or other features of vehicle 12, such as hitch ball 22 (FIG. 1), with known positions relative to center 96 of the vehicle 12.

The image processing routine 86 can be specifically programmed or otherwise configured to locate coupler 16 within image data. In one example, the image processing routine 86 can identify the coupler 16 within the image data based on stored or otherwise known visual characteristics of coupler 16 or hitches in general. In another embodiment, a marker in the form of a sticker, or the like, may be affixed with trailer 18 in a specified position relative to coupler 16 in a manner similar to that which is described in commonly-assigned U.S. Pat. No. 9,102,271, the entire disclosure of which is incorporated by reference herein. In such an embodiment, image processing routine 86 may be programmed with identifying characteristics of the marker for location in image data, as well as the positioning of coupler 16 relative to such a marker so that the position 24 of coupler 16 can be determined based on the marker location.

Additionally or alternatively, controller 14 may seek confirmation of the determined coupler 16, via a prompt on touchscreen 74. If the coupler 16 determination is not confirmed, further image processing may be provided, or user-adjustment of the position 24 of coupler 16 may be facilitated, either using touchscreen 74 or another input to allow the user U to move the depicted position 24 of coupler 16 on touchscreen 74, which controller 14 uses to adjust the determination of position 24 of coupler 16 with respect to vehicle 12 based on the above-described use of image data. Alternatively, the user U can visually determine the position 24 of coupler 16 within an image presented on HMI 66 and can provide a touch input in a manner similar to that which is described in commonly-assigned U.S. Pat. No. 10,266,023, the entire disclosure of which is incorporated by reference herein. The image processing routine 86 can then correlate the location of the touch input with the coordinate system 36 applied to image data shown on the display 72, which may be depicted as shown in FIG. 3.

As shown in FIG. 3, the image processing routine 86 and operating routine 90 may be used in conjunction with each other to determine the path 20 along which hitch assist system 10 can guide vehicle 12 to align hitch ball 22 and coupler 16 of trailer 18. In the example shown, an initial position of vehicle 12 relative to trailer 18 may be such that coupler 16 is only in the field of view 92c of side camera 60c, with vehicle 12 being positioned laterally from trailer 18 but with coupler 16 being almost longitudinally aligned with hitch ball 22. In this manner, upon initiation of hitch assist system 10, such as by user input on touchscreen 74, for example, image processing routine 86 can identify coupler 16 within the image data of camera 60c and estimate the position 24 of coupler 16 relative to hitch ball 22. The position 24 of the coupler 16 may be identified by the system 10 using the image data in accordance by receiving focal length information within image data to determine a distance $D_c$ to coupler 16 and an angle $\alpha_c$ of offset between coupler 16 and the longitudinal axis of vehicle 12. This information may also be used in light of the position 24 of coupler 16 within the field of view of the image data to determine or estimate the height $H_c$ of coupler 16. Once the positioning $D_c$, $\alpha_c$ of coupler 16 has been determined and, optionally, confirmed by the user U, the controller 14 can take control of at least the vehicle steering system 50 to control the movement of vehicle 12 along the desired path 20 to align the hitch position 26 of the vehicle hitch ball 22 with coupler 16.

Continuing with reference to FIGS. 3 and 4 with additional reference to FIG. 2, controller 14, having estimated the positioning $D_c$, $\alpha_c$ of coupler 16, as discussed above, can, in one example, execute path derivation routine 88 to determine vehicle path 20 to align the vehicle hitch ball 22 with coupler 16. In particular, controller 14 can have stored in memory 84 various characteristics of vehicle 12, including the wheelbase W, the distance from the rear axle to the hitch ball 22, which is referred to herein as the drawbar length L, as well as the maximum angle to which the steered wheels 54 can be turned $\delta_{max}$. As shown, the wheelbase W and the current steering angle $\delta$ can be used to determine a corresponding turning radius $\rho$ for vehicle 12 according to the equation:

$$\rho = \frac{1}{W \tan \delta} \qquad (1)$$

in which the wheelbase W is fixed and the steering angle $\delta$ can be controlled by controller 14 by communication with steering system 50, as discussed above. In this manner, when the maximum steering angle $\delta_{max}$ is known, the smallest possible value for the turning radius $\rho_{min}$ is determined as:

$$\rho_{min} = \frac{1}{W \tan \delta_{max}} \qquad (2)$$

Path derivation routine 88 can be programmed to derive vehicle path 20 to align a known location of the vehicle hitch ball 22 with the estimated position 24 of coupler 16 that takes into account the determined minimum turning radius $\rho_{min}$ to allow path 20 to use the minimum amount of space and maneuvers. In this manner, path derivation routine 88 can use the position of vehicle 12, which can be based on the center 96 of vehicle 12, a location along the rear axle, the location of the dead reckoning device 34, or another known location on the coordinate system 36, to determine both a lateral distance to the coupler 16 and a forward or rearward distance to coupler 16 and derive a path 20 that achieves the needed lateral and forward-backward movement of vehicle 12 within the limitations of steering system 50. The derivation of path 20 further takes into account the positioning of hitch ball 22, based on length L, relative to the tracked location of vehicle 12 (which may correspond with the center 96 of mass of vehicle 12, the location of a GPS receiver, or another specified, known area) to determine the needed positioning of vehicle 12 to align hitch ball 22 with coupler 16.

Figure 5:
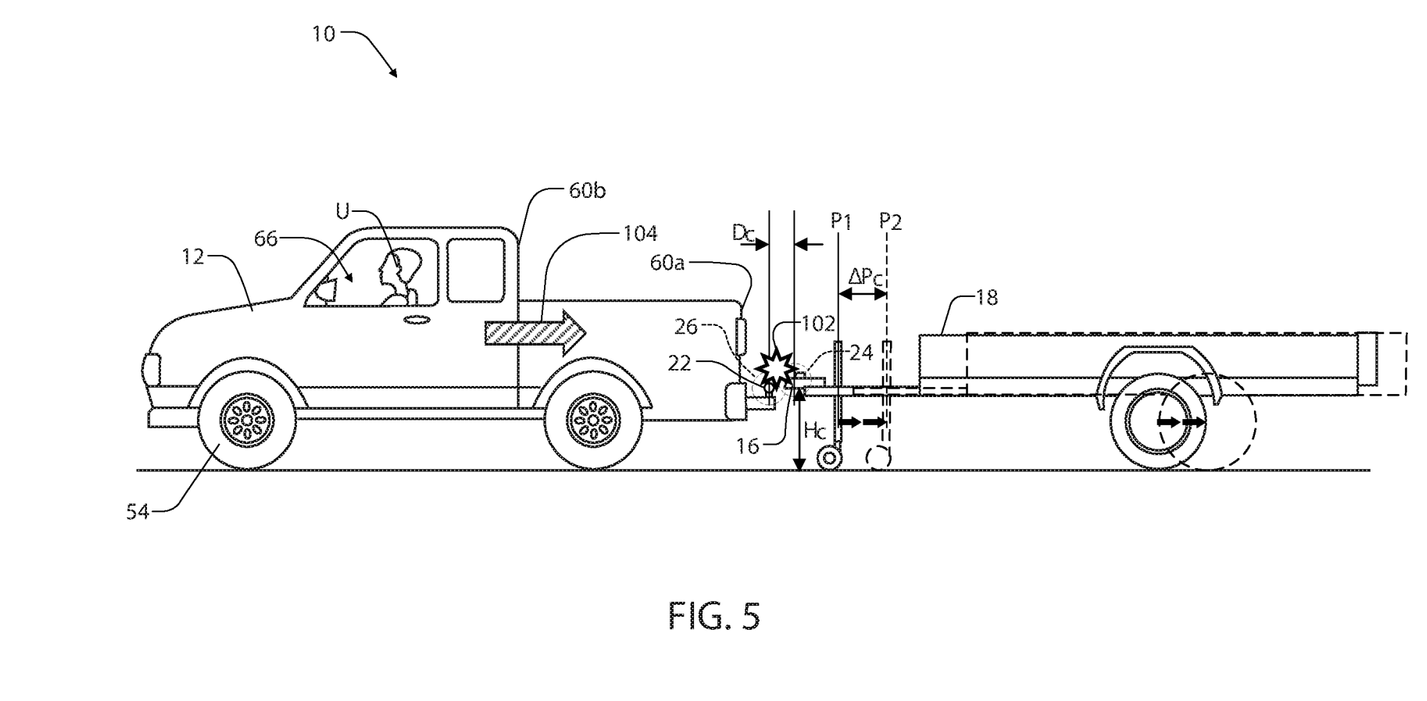
FIG. 5 is a schematic diagram of a vehicle navigating toward a trailer in a reverse direction.

Referring now to FIG. 5, a schematic diagram of the vehicle 12 moving toward the trailer 18 in reverse is shown. As demonstrated in FIG. 5, the trailer 18 may move from a first position $P_1$ to a second position $P_2$ during the navigation of the vehicle 12 along the vehicle path 20. The movement of the trailer is denoted as a position change $\Delta P_c$ in the coupler position 24. As previously discussed, the movement of the trailer 18 and the corresponding position change $\Delta P_c$ in the coupler position 24 may result due to the trailer 18 shifting on an incline or in response to an external force 102 applied to the trailer 18. The external force 102 may be applied to the trailer 18 by any source, such as the vehicle 12, a person, or various external forces that may be encountered during operation of the hitch assist system 10. As illustrated, the external force 102 is applied by the vehicle 12 resulting from a rearward movement 104 of the vehicle 12. Accordingly, detecting the position change $\Delta P_c$ of the coupler position 24 may be beneficial to prevent situations wherein the controller 14 of the system 10 attempts to guide the vehicle 12 to follow or chase the trailer 18 during a position change $\Delta P_c$.

Referring now to FIGS. 4 and 5, in order to avoid such a chase situation, the system 10 may be configured to detect the position change $\Delta P_c$ and pause or stop the navigation of the vehicle 12 along the vehicle path 20 in response to the detection. As discussed in reference to FIG. 1, the controller 14 may apply the image processing routine 86 to scan image data captured in one or more of the fields of view 92 (e.g., 92a, 92b, 92c, 92d) to identify the coupler 16 and estimate the position 24 of coupler 16 relative to hitch ball 22. The position 24 of the coupler 16 may be identified by the system 10 using the image data and corresponding focal length information of the image data to determine a distance $D_c$ to coupler 16. In this way, the controller 14 may monitor and update the distance $D_c$ to the coupler 16 in order to identify the position change $\Delta P_c$ of the coupler 16. The controller 14 may similarly or equivalently identify a distance change $\Delta D_c$ to the coupler 16 that is not attributed to the controlled motion of the vehicle 12 to identify the position change $\Delta P_c$. As such, the controller 14 of the system 10 may be configured to identify the coupler position 24 and identify a change in the position of the trailer 18 and the coupler 16 over time.

In an exemplary embodiment, the controller 14 may be configured to detect a warning condition due to the movement of the trailer 18 if the position change $\Delta P_c$ of the coupler 16 exceeds a position change threshold $\Delta P_{max}$ over a predetermined period of time $\Delta T_{threshold}$. That is, the controller 14 may detect the warning condition in response to the position change $\Delta P_c$ of the coupler 16 as:

IF $\Delta P_c > \Delta P_{max}$ over $\Delta T_{threshold}$, THEN motion warning condition  (3)

Accordingly, if the position change $\Delta P_c$ of the coupler 16 exceeds the $\Delta P_{max}$, then the controller 14 may identify the warning condition and take preventative measures to alert the user U that the trailer 18 or coupler 16 appear to be in motion and stop the navigation of the vehicle 12. In this way, the controller 14 may detect the position change $\Delta P_c$ of the coupler 16 and prevent a runaway condition of the vehicle 12 be controlled to chase the movement of the trailer 18.

Figure 6:
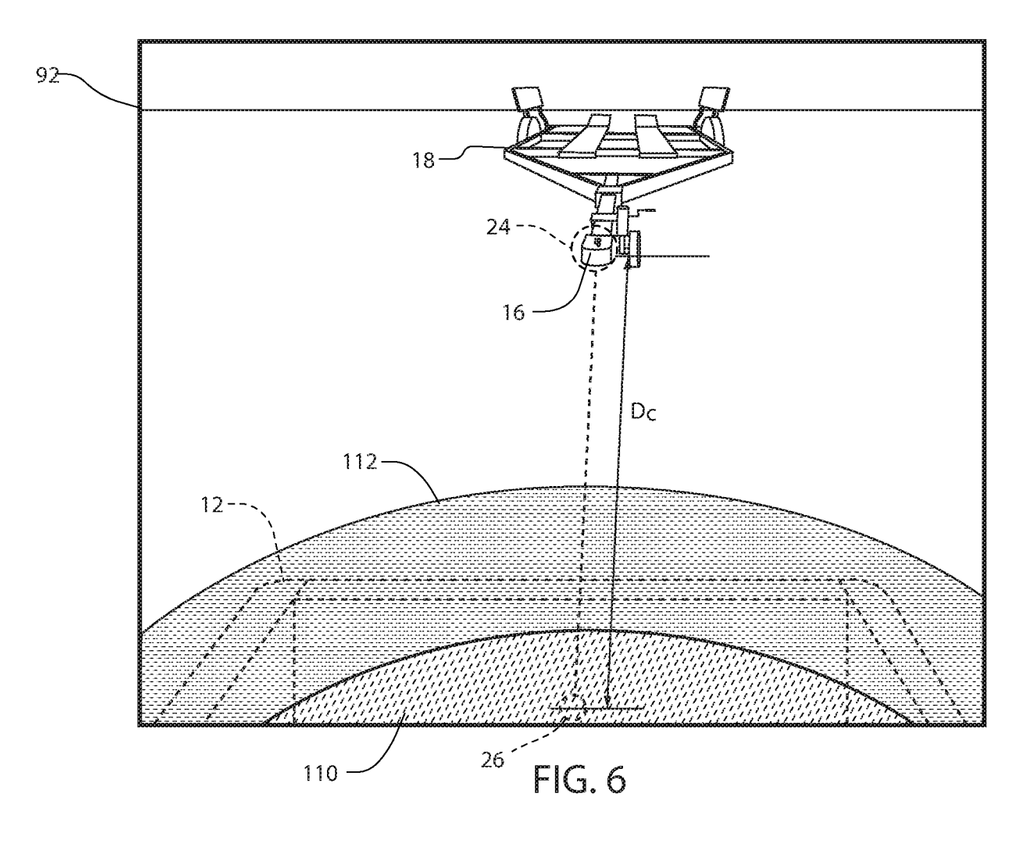
FIG. 6 is a projected view of image data captured in one or more of the fields of view of imaging devices of the system.

FIG. 6 demonstrates image data that may be captured in one or more of the fields of view 92a-92d of the cameras 60 or imaging devices. Referring now to FIGS. 5 and 6, the system 10 may be configured to process the image data captured in the fields of view 92 to identify the coupler position 24 of the coupler 16. As previously discussed, if the coupler position 24 changes during the approach of the vehicle 12 along the vehicle path 20, the controller 14 may identify the position change $\Delta P_c$ in the coupler position 24. In some embodiments, the controller 14 may vary the control of the vehicle 12 in response to the identification of the warning condition based on the proximity of the vehicle 12 to the trailer 18. That is, the controller 14 may control the system 10 differently if the position change $\Delta P_c$ is detected when the coupler distance $D_c$ indicates that the coupler 16 is closer or further from the vehicle 12.

For example, in response to identifying the motion of the coupler 16 (e.g., motion of the trailer 18) when the trailer 18 is within a first proximity 110, the controller 14 may respond by controlling the vehicle 12 via a first action. In response to identifying the motion of the trailer 18 and/or the coupler 16 between the first proximity 110 and a second proximity 112, the controller 14 may respond by controlling the vehicle 12 via a second action. If the motion of the trailer 18 and/or the coupler 16 is identified beyond the second proximity 112, the controller 14 may respond by controlling the vehicle 12 via a third action. Each of the actions may correspond to different motion controls for the navigation of the vehicle 12, messages or audible warnings, changes in the operating state of the vehicle (e.g., gear changes, brake actuations), etc. In this way, the controller 14 may tailor the response of the hitch assist system 10 based on the proximity of the vehicle 12 to the trailer 18.

As shown in FIG. 5, the hitch ball 22 of the vehicle 12 is shown impacting the coupler 16 of the trailer 18 as a result of a rearward movement 104 of the vehicle 12. In response to the force 102 applied by the vehicle 12 to the trailer 18, the coupler position 24 may move resulting in the position change $\Delta P_c$. In such a situation, the position change $\Delta P_c$ in the coupler position 24 may be detected by the controller 14 in the first proximity 110. In response to the detection of the position change $\Delta P_c$ when the coupler distance $D_c$ is within the first proximity 110, the controller 14 may apply the first action as an emergency stop of the vehicle 12. Such a response may be appropriate as the detection of the position change $\Delta P_c$ of the coupler 16 and/or the trailer 18 in the first proximity 110 may be the result of a collision between the hitch ball 22 and the coupler 16.

In other situations, when the detection of the position change $\Delta P_c$ of the coupler 16 and/or the trailer 18 are identified when the coupler distance $D_c$ is greater than the first proximity 110 or the second proximity 112, the response of the controller 14 to control the vehicle 12 may be less severe or abrupt. For example, if the position change $\Delta P_c$ of the coupler 16 and/or the trailer 18 is identified when the coupler distance $D_c$ is between the first proximity 110 and the second proximity 112, the controller 14 may apply the second action and control the vehicle 12 to stop gradually over a greater distance relative to the emergency stop of the first action. Additionally, if the position change $\Delta P_c$ of the coupler 16 and/or the trailer 18 is identified when the coupler distance $D_c$ is beyond the second proximity 112, the controller 14 may apply the third action. The third action may comprise a verification of the detection of the position change $\Delta P_c$ and may not stop the vehicle 12 until the position change $\Delta P_c$ is verified by the controller 14. Accordingly, the controller 14 may tailor the response of the control of the vehicle 12 based on the proximity of the vehicle 12 to the trailer 18.

In some embodiments, the controller 14 may further be configured to control additional components and/or accessories of the hitch assist system 10 in response to the detection of the position change $\Delta P_c$ of the coupler 16 for each of the actions and corresponding proximities of the vehicle 12 to the trailer 18. For example, the controller 14 may control one or more of the indicator devices 78 as an action in response to the detection of the position change $\Delta P_c$. As previously discussed, the indicator devices 78 may correspond to conventional vehicle indicators, such as a vehicle horn 78a, lights 78b, vehicle accessories 78c, and various devices in communication with the controller 14 (e.g., the HMI 66, the portable device 80, etc.). Accordingly, the controller 14 may be configured to control various audible, visible, and/or textual alerts or messages to identify the actions or instructions in response to the detection of the position change $\Delta P_c$.

Figure 7:
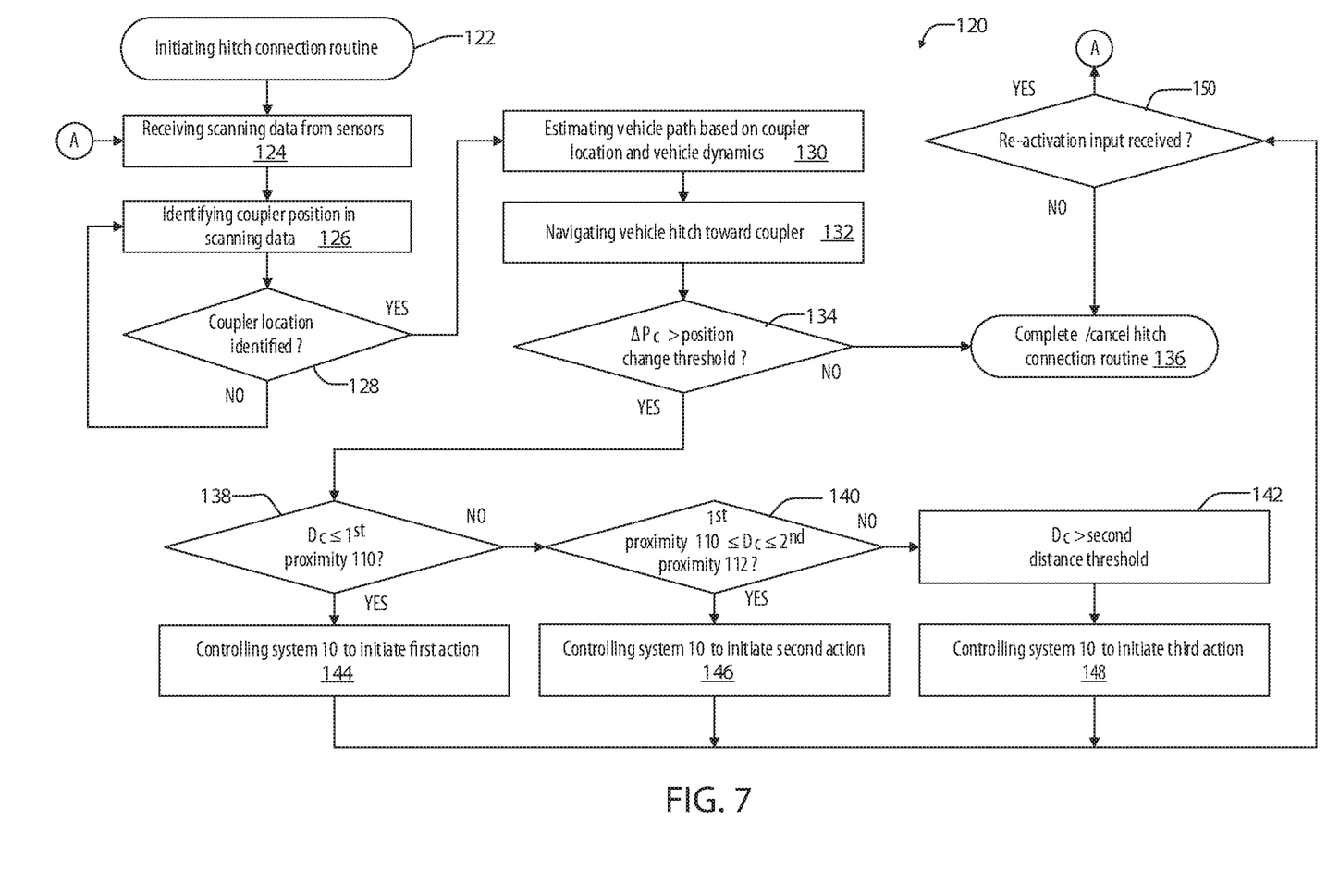
FIG. 7 is a flow chart of a method for detecting the position change of a coupler of a trailer in accordance with the disclosure.

Referring now to FIG. 7, a flow chart of a method 120 for detecting the position change $\Delta P_c$ of the coupler 16 is shown. The method 120 may begin by initiating a hitch connection routine (122). The hitch connection routine may begin by receiving scanning data from sensors in communication with the controller 14—for example the cameras 60a-60d (124). The microprocessor 82 may process the scanning data (e.g., image data) by applying the image processing routine 86 thereby identifying the coupler position 24 (126). If the coupler position 24 is identified in step 128, the method 120 may continue to estimate the vehicle path 20 based on coupler position 24 and the dynamics of the vehicle 12 (130). If the coupler position 24 is not identified in step 128, the method 120 may return to step 126. With the vehicle path 20 calculated, the controller 14 may continue by controlling the navigation of the vehicle 12 aligning the hitch with the coupler (132).

Throughout the navigation of the vehicle 12, the controller 14 may continue monitoring the scanning data to identify the position change $\Delta P_c$ of the coupler 16. As previously discussed, the position change $\Delta P_c$ of the coupler 16 may be identified in response to the coupler position 24 exceeding a position change threshold $\Delta P_{max}$ over a predetermined period of time $\Delta T_{threshold}$. If the position change $\Delta P_c$ of the coupler 16 does not exceed the change threshold $\Delta P_{max}$ in step 134, the controller 14 may continue to complete the hitch connection routine (136). If the position change $\Delta P_c$ of the coupler 16 does exceed the change threshold $\Delta P_{max}$ in step 134, the controller 14 may continue to steps 138, 140, and 142 to identify the proximity of the vehicle 12 to the trailer 18. In this way, the hitch assist system 10 may be configured to control the vehicle 12 and/or the various devices in communication with the system 10 to respond according to a desired operation appropriate for the detection of the position change $\Delta P_c$ and the corresponding proximity of the vehicle 12 to the trailer 18.

In some embodiments, the change threshold $\Delta P_{max}$ may vary depending on the coupler distance $D_c$. For example, the position change threshold $\Delta P_{max}$ may be less if the coupler position 24 is within the first proximity 110 than if the coupler position 24 is between the first proximity and the second proximity. Additionally, if the coupler position 24 is outside the first proximity 110 and the second proximity 112, position change threshold $\Delta P_{max}$ may be greater than if the coupler position 24 is within the first proximity 110 and the second proximity 112. Accordingly, the position change threshold $\Delta P_{max}$ may vary or increase in sensitivity (i.e., decrease in distance for $\Delta P_{max}$) based on the coupler distance $D_c$ indicating that the trailer 18 is closer to the vehicle 12.

In step 138, if the detection of the position change $\Delta P_c$ is identified when the coupler distance $D_c$ is within the first proximity 110, the controller 14 may apply the first action as an emergency stop of the vehicle 12 (144). Such a response may be appropriate as the detection of the position change $\Delta P_c$ of the coupler 16 and/or the trailer 18 in the first proximity 110 may be the result of a collision between the hitch ball 22 and the coupler 16. In step 140, if the detection of the position change $\Delta P_c$ is identified when the coupler distance $D_c$ is greater than the first proximity 110, but less than the second proximity 112, the controller 14 may apply the second action and control the vehicle 12 to stop gradually over a greater distance relative to the emergency stop of the first action (146). In step 142, if the detection of the position change $\Delta P_c$ is identified when the coupler distance $D_c$ is greater than the second proximity 112, the controller 14 may apply the third action (148). The third action may comprise a verification of the detection of the position change $\Delta P_c$ and may not stop the vehicle until the position change $\Delta P_c$ of the coupler 16 is verified. If the position change $\Delta P_c$ is verified, the controller 14 may also gradually stop the vehicle 12 by controlling the vehicle brake control system 62 and the powertrain control system 64. Accordingly, the controller 14 may provide for a different action or control output based on the proximity of the vehicle 12 to the trailer 18 in response to the identification of the position change $\Delta P_c$.

Following each of the actions in steps 144, 146, and 148, the vehicle 12 may be stationary as a result of the stoppage controlled by the controller 14. Accordingly, in step 150, the controller 14 may communicate with the user U via the HMI 66, the portable device 80, or various communication devices to display a request for a reactivation input. In response to receiving the reactivation input via a user interface of the HMI 66, the portable device 80, or similar devices, the controller 14 may return to step 104 to receive the scanning data from the sensors and identify the coupler position 24. If a reactivation input is not received or a cancellation input is received, the controller 14 may continue to step 136 to cancel the hitch connection routine. In this way, the controller 14 may request feedback from the user U prior to re-initializing the hitch connection routine.

Though specific operations are described for each of the actions in response to identifying the position change $\Delta P_c$, the controller 14 may be configured to control the motion of the vehicle 12 and/or additional components and/or accessories of the hitch assist system 10 in response to the detection of the position change $\Delta P_c$ of the coupler 16. That is, the system 10 may be configured to control various vehicle maneuvering control systems as discussed herein (e.g., steering system 50, vehicle brake control system 62, the powertrain control system 64, etc.) as well as the indicator devices 78 to provide a desired output associated with each of the actions discussed in reference to steps 144, 146, and 148. Accordingly, the disclosure provides for a flexible system that may be implemented in a various configurations to suit a desired operation of the hitch assist system 10.

It is to be understood that variations and modifications can be made on the aforementioned structure without departing from the concepts of the present disclosure, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A vehicle system, comprising:
   a hitch ball mounted on a vehicle; and
   a controller configured to:
   identify a coupler position of a trailer;
   control motion of the vehicle aligning the hitch ball with the coupler position;
   identify a change in the coupler position, wherein the change in the coupler position is identified in response to a change in the coupler position exceeding a predetermined change threshold; and
   stop the motion of the vehicle in response to the change in the coupler position of the trailer.

2. The system according to claim 1, wherein a stopping distance is adjusted based on a proximity of the vehicle to the coupler position.

3. The system according to claim 1, further comprising:
   a sensor apparatus in communication with the controller, wherein the sensor apparatus is configured to scan a region proximate to the vehicle and detect the coupler position of a coupler of the trailer.

4. The system according to claim 3, wherein the sensor apparatus comprises an imaging system including one or more cameras mounted on the vehicle, wherein:
   the controller identifies the coupler position based on image data received from the imaging system comprising position data of the coupler.

5. The system according to claim 1, wherein the predetermined change threshold comprises a distance threshold identified over a predetermined time.

6. The system according to claim 1, wherein the coupler position is a location of a coupler of the trailer, wherein the coupler is configured to mate to the hitch in a towing configuration.

7. The system according to claim 1, wherein the controller is further configured to:
   apply a first motion control to the movement of the vehicle in response to identifying the change in the coupler position when the vehicle is beyond a predetermined distance of the trailer.

8. The system according to claim 7, wherein the controller is further configured to:
   apply a second motion control to the movement of the vehicle in response to identifying the change in the coupler position when the vehicle is within the predetermined distance.

9. The system according to claim 8, wherein the first motion control stops the vehicle over a greater distance than the second motion control.

10. The system according to claim 8, wherein the second motion control comprises rapidly applying the service brakes of the vehicle.

11. The system according to claim 7, wherein the first motion control comprises gradually applying service brakes of the vehicle.

12. The system according to claim 7, wherein the predetermined distance identifies that the hitch is within a collision proximity relative to the coupler.

13. The system according to claim 1, wherein the change in the coupler position exceeding the predetermined change threshold indicates movement of the trailer and the vehicle is stopped preventing the vehicle from chasing the trailer.

14. A method for controlling a vehicle with a hitch assist system, the method comprising:
   identifying a coupler position of a trailer in sensor data;
   controlling motion of the vehicle aligning the hitch ball with the coupler position;
   identifying a change in the coupler position in response to the coupler position exceeding a position change threshold; and
   stopping the motion of the vehicle in response to the change in position of the trailer.

15. The method according to claim 14, wherein a stopping distance of the stopping is adjusted in response to a proximity of the vehicle to the coupler position.

16. The method according to claim 14, further comprising:
capturing image data scanning of a region proximate the vehicle, wherein the coupler position is identified based on the image data.

17. The method according to claim 14, wherein the change in the coupler position is detected in response to a change in the coupler position exceeding a distance threshold identified over a predetermined time.

18. A vehicle system, comprising:
a hitch ball mounted on a vehicle;
a sensor system configured to detect a coupler position of a trailer; and
a controller configured to:
control motion of the vehicle aligning the hitch ball with the coupler position;
monitor a coupler distance of the coupler position relative to the vehicle;
identify a change in the coupler position in excess of a change threshold, wherein the motion in excess of the change threshold indicates that the trailer is moving or an error in the detection of the coupler position; and
stop the motion of the vehicle in response to the change in position of the trailer, wherein the stopping of the motion of the vehicle is completed over a greater travel distance of the vehicle in response to the coupler distance being greater than a collision proximity between the vehicle and the trailer.

19. The system according to claim 18, wherein the stopping of the motion of the vehicle is controlled to immediately stop the vehicle in response to the coupler distance being less than the collision proximity.

20. The system according to claim 18, wherein the coupler position is a location of a coupler of the trailer, wherein the coupler is configured to mate to the hitch in a towing configuration.

* * * * *